Jan. 29, 1952 — C. W. WADDELL — 2,583,616
FISH LURE
Filed March 1, 1946
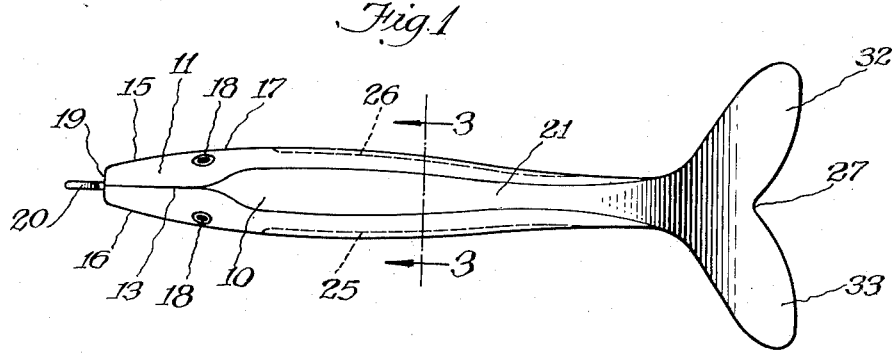
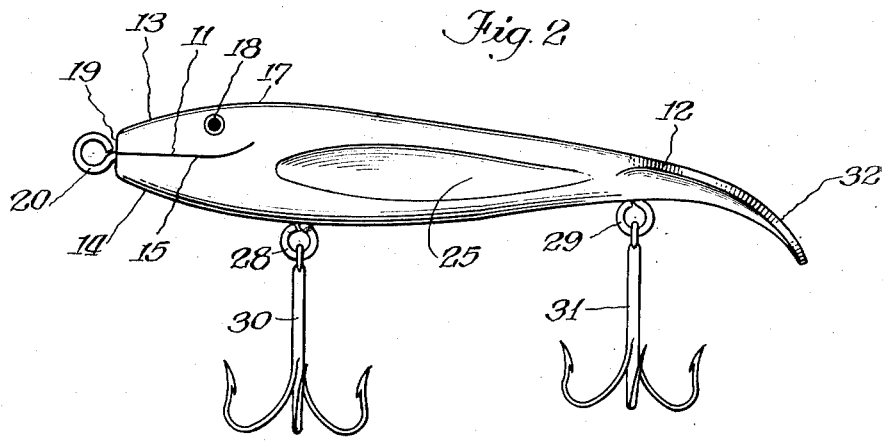
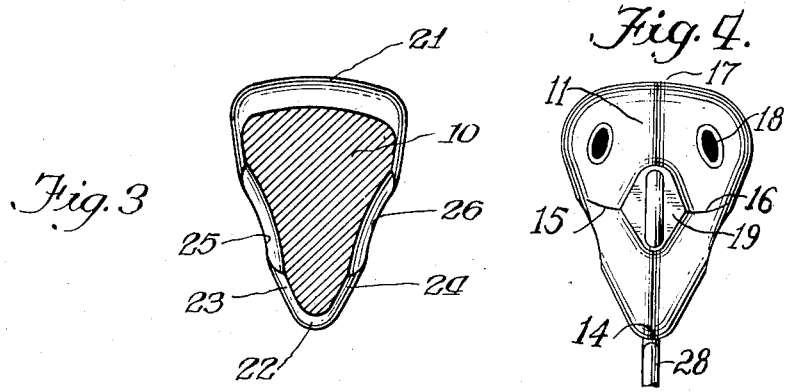
INVENTOR.
Clark William Waddell.
BY Archibald D. McKellar
Attorney.

Patented Jan. 29, 1952

2,583,616

UNITED STATES PATENT OFFICE 2,583,616

FISH LURE

Clark William Waddell, Chicago, Ill.

Application March 1, 1946, Serial No. 651,332

2 Claims. (Cl. 43—42.48)

The invention relates to improvements in fish lures, but more particularly to devices of this kind which may be constructed in forms resembling live bait or provided with means for making them appear lifelike when in use, and has for its objects the provision of a device of this kind which will be simple in construction, economical to manufacture and efficient in use.

Other objects will hereinafter appear.

The invention consists in the combinations and arrangements of parts hereinafter described and claimed.

The invention will be best understood by reference to the accompanying drawings forming a part of this specification and in which—

Figure 1 is a top plan view of such a device embodying the invention;

Figure 2 is a side view showing treble hooks as arranged therewith;

Figure 3 is an enlarged section taken on line 3—3 of Figure 1; and

Figure 4 is an enlarged front elevation of Figure 1.

The embodiment of the invention illustrated in the drawings comprises an integrally formed solid body 10, having a head portion 11, and tail 12. The head 11, in form, is substantially that of the frustum of a four-sided pyramid having at its top a corner 13, a bottom corner 14, and side corners 15 and 16, with the base 17 of the frustum joining the body 10 just rearwardly of the eyes 18—18, the top plane thereof constituting the nose 19 and from which projects the eye member 20 and is used to attach the necessary line for moving the lure through the water. The back 21 forming the top of the body 10 has a substantially flat surface, being broad in front and tapering rearwardly to the juncture with the tail 12. The bottom of the belly portion 22 is narrow and rounded, as best shown in Figure 3. The side walls 23 and 24 are joined to the back 21, providing a substantially V shaped hull for the body 10, as best shown in Figure 3. Oval shaped concavities 25 and 26 are arranged lengthwise of the said sides 23 and 24 and extend substantially the full length thereof, the longitudinal axes of the concavities being in substantial longitudinal parallelism with the surface of the flat back, said concavities partly serving as guide means when the lure is in motion in the water.

The tail 12 comprises substantially flat lobes 32 and 33 projecting downwardly and rearwardly, to the left and right, respectively, from the juncture with the body 10, providing a V shaped notch 27 at the rearward marginal juncture of said lobes as best shown in Figure 1, the belly 22 terminating at the notch 27, said notch being in alignment with said concavities as best shown in Figure 2. The oval-shaped concavities 25 and 26 when in motion serve to draw the water toward the sides 23 and 24, causing a part of a current to pass against the lower surface of the lobes 32 and 33 and a part through the notch 27. By this arrangement the lure is stabilized sufficiently to prevent rotation and to retain a position in angular relation to the surface of the water and to the pull of the line.

The lure is further provided with loops 28 and 29 to which are attached the usual treble hooks 30 and 31, respectively, in positions to assist in stabilizing the body 10 when in use. In this respect it is to be noted that the eye 28 is attached to the belly 22 just rearwardly of the head 11, in which position weight is added to the already heavy forward portion of the body 10 and the loop 29 is positioned substantially at the junction of the body 10 with the tail 12, in which position the treble hook 31 will swing rearwardly towards the notch 27, as will be readily understood.

The tail 12, comprising lobe members 32 and 33, is arranged horizontally and in divergent projection, as best shown in Figure 1, providing rudder means for elevating the body 10 into angular relation with the direction of travel when in use. By this arrangement the position of the body 10 is in angular relation with the surface of the water while in motion and, when the pull of the cast is spent, the combined effect of the heavy forward end of the body 10 with the rudder effect of the tail 12 causes the lure to settle with a tail-wobbling motion toward the bottom of the water in an angular and natural feeding manner of a minnow.

While I have illustrated and described an embodiment of my invention, I do not wish to be confined to the exact details thereof but desire to avail myself of such variations and modifications as may fall within the spirit and scope of the appended claims.

I claim:

1. A fish lure comprising a unit of integral form arranged and adapted to be drawn through the water by a suitable line, having a tail portion and a head portion which is substantially the frustrum of a pyramid; a back having a substantially flat surface narrowing toward said tail portion; side walls extending in a downwardly and inwardly direction and joining a rounded belly portion; an elongated oval concavity on each side wall extending substantially the length thereof; the longitudinal axes of the concavities being in substantial longitudinal parallelism with the surface of the flat back and in cooperative alignment with said tail portion for holding said unit in angular relation with the surface of the water.

2. In a fish lure body of integral construction arranged and adapted to be drawn through the water by a suitable line and having a head portion; a flat back portion narrowing rearwardly toward a tail portion; the said tail portion comprising two divergent lobe members arranged to project downwardly and rearwardly from said body; an elongated oval concavity in each side wall of said body; the divergence of said lobe members provide a substantially vertical notch in said tail portion in alignment with the elongated oval concavities in each side wall.

CLARK WILLIAM WADDELL.

REFERENCES CITED

The following references are of record in the file of this patent:

UNITED STATES PATENTS

| Number | Name | Date |
| --- | --- | --- |
| 1,060,873 | Wilson | May 6, 1913 |
| 1,681,316 | Waters | Aug. 21, 1928 |
| 1,855,097 | Chamberlaine | Apr. 19, 1932 |
| 1,866,465 | Harrington et al. | July 5, 1932 |
| 2,159,591 | Leusch et al. | May 23, 1939 |